United States Patent [19]

Rosenfeld

[11] 4,228,230

[45] Oct. 14, 1980

[54] ULTRASONIC IMAGING OF INTERNALLY FOGGED SILVER HALIDE ELEMENTS

[75] Inventor: Robert B. Rosenfeld, Rochester, N.Y.

[73] Assignee: Eastman Kodak Company, Rochester, N.Y.

[21] Appl. No.: 3,571

[22] Filed: Jan. 15, 1979

[51] Int. Cl.$^3$ ............................................... G03C 5/24
[52] U.S. Cl. ...................................... 430/3; 430/406; 430/411
[58] Field of Search ............... 96/27 E, 64; 128/2 V, 128/660; 204/157.15; 73/606; 430/3, 409, 411, 596, 598

[56] References Cited

PUBLICATIONS

Ultrasonics, High & Low Intensity Applications, Chap. 10, pp. 351-389.
Ernst, Ultrasonography, J. of Acous. Soc. of Amer., Jan. 1951, vol. 23, No. 1, pp. 80-83.
Soviet Physics—Acoustics, vol. 9, No. 3, Jan.-Mar., 1964, pp. 301-302.
Soviet Physics—Acoustics, vol. 12, No. 3, Jan.-Mar., 1967, pp. 241-248.
Gregoss Techniques and Information Content of Sonoholograms, pp. 329-332.
Totani, Latent Image Formation by Ultrasonic Waves, pp. 155-161.
Totani, On Latent Image Formation by Ultrasonics in Water, pp. 57-59.
Totani, On The Mechanism of the Photographic Effect of Ultrasonic Waves in Water, pp. 45-54.
Berger et al., "Photographic Film Detection Methods for Ultrasonic Field Visualization", J. Acoust. Soc. Am. 34(4), 518-519 (1962).

*Primary Examiner*—Mary F. Downey
*Attorney, Agent, or Firm*—Carl O. Thomas

[57] ABSTRACT

A process is disclosed of forming in a silver halide photographic element a visible image corresponding to a pattern of ultrasonic exposure. This process is characterized by providing in the photographic element internally fogged silver halide grains and contacting the element with a transport liquid in the presence of a solute capable of rendering the internally fogged silver halide grains developable in a surface developer. The element is then imagewise ultrasonically exposed and developed with a surface developer to produce a visible image defined by the pattern of ultrasonic exposure.

18 Claims, 6 Drawing Figures

ULTRASONIC IMAGING OF INTERNALLY FOGGED SILVER HALIDE ELEMENTS

FIELD OF THE INVENTION

This invention is an improvement in ultrasonography. More specifically, this invention is directed to a process of forming a visible image in a silver halide element through the use of imagewise ultrasonic alteration of a silver halide emulsion layer and conversion of the imagewise ultrasonically induced alteration of the element to a viewable ultrasonographic image.

BACKGROUND OF THE INVENTION

The term "ultrasonic radiation" is employed in this specification to designate pressure-rarefaction waves differing from sound waves in exhibiting higher frequencies and shorter wavelengths. The term "ultrasonic exposure" is employed to designate exposure to ultrasonic radiation. The production of visible images by means of ultrasonic radiation is referred to as "ultrasonoscopy". The production of a visible record by means of ultrasonic radiation is referred to as "ultrasonography". The instruments for producing ultrasonoscopic images are designated "ultrasonoscopes", and the ultrasonoscopes which produce ultrasonographic images are referred to as "sonographic cameras". The definition of terms as here presented is believed to be generally consistent with the use of these terms in the art. Specifically, these terms are suggested by P. J. Ernst in the *Journal of the Accoustical Society of America*, Vol. 22, No. 1, in an article entitled "Ultrasonography", pp. 80–83, January 1951.

The prior state of the art with respect to the action of ultrasound on silver halide photographic elements is reviewed by M. E. Arkhangel'skii, *Soviet Physics—Acoustics*, Vol. 12, No. 3, "Action of Ultrasound on the Processes of Photographic Development and Fixing", pp. 241–248, January–March 1967. The ability of ultrasound exposure to produce a latent image in silver halide emulsions has been recognized since the 1930's. However, power level requirements to achieve ultrasonic imaging have been quite high, and there have been controversies as to whether the ultrasound directly produces the latent image or stimulates other effects, such as cavitation-stimulated luminesence, which produces the latent image. It has been recognized that higher maximum densities are attainable for a given power level of ultrasonic exposure when the photographic element is in contact with a photographic developer. Arkhangel'skii observed that if the photographic element is first light exposed and then ultrasonically exposed in a developer, the ultrasonic time and intensity to produce a density obtainable in the absence of light exposure decrease to a few minutes and a few watts per square centimeter, respectively.

It has been a difficulty in the art that ultrasonic exposure requirements of silver halide photographic elements, even with the most responsive techniques known, have remained unattractively high. For example, such techniques have required intensity and time levels of ultrasonic exposure which are objectionable to many nondestructive testing applications, such as mammographic examination with ultrasound as described by Brendon U.S. Pat. No. 3,765,403. A further disadvantage has been that ultrasonic effects on the developability of silver halide have not been noted to provide good resolution, to the extent that many investigations have merely reported effects, but provided no indication that imaging was obtained or obtainable. Further, known processes which require ultrasound exposure of light fogged silver halide elements in the course of development are inherently prone to poor resolution and development in background areas—e.g., elevated minimum densities.

SUMMARY OF THE INVENTION

The process of the present invention overcomes these difficulties. In one aspect this invention is directed to a process of producing an ultrasonographic image in an element comprised of a support and, coated thereon, a silver halide emulsion layer containing internally fogged silver halide grains. The element is contacted with a transport liquid in the presence of a diffusible solute capable of rendering the internally fogged silver halide grains, after contact with the solute, developable in a surface developer. The element is exposed to ultrasound in an image pattern to accelerate diffusion of the solute into contact with the internally fogged silver halide grains, and the element is developed with a surface developer to produce a visible image defined by the imagewise pattern of ultrasonic exposure.

In another aspect this invention is directed to a process of producing a positive ultrasonographic image in an element comprised of a support and, coated thereon, a silver halide emulsion containing internally fogged silver halide grains. The element is contacted with a transport liquid in the presence of a silver halide solvent and exposed to ultrasound to dissolve silver halide selectively in exposed areas of the element. The element is developed to produce a positive silver image defined by the imagewise pattern of ultrasonic exposure.

The invention can be better appreciated by reference to the following detailed description considered in conjunction with the drawings, in which FIGS. 1 and 3 through 6 are plots of density versus ultrasonic exposure and FIG. 2 is a plot of density versus immersion time.

DESCRIPTION OF PREFERRED EMBODIMENTS

Figure 1:
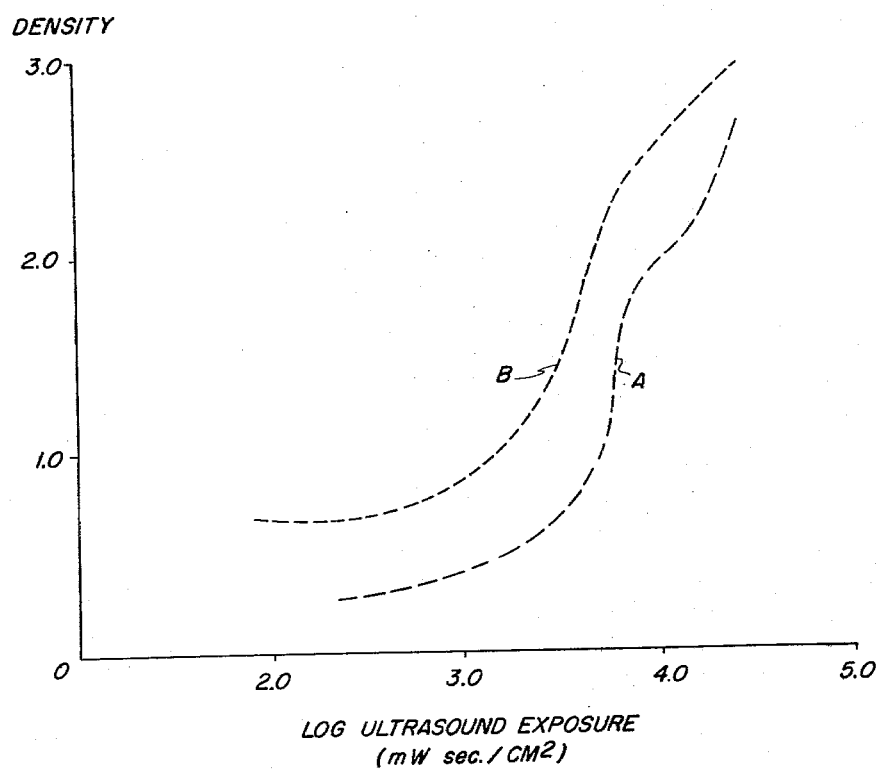

To form an ultrasonograph according to this process any silver halide element can be employed comprised of a support and, coated thereon, at least one silver halide emulsion layer which contains internally fogged silver halide grains. Such elements are hereinafter designated internally fogged silver halide elements or, more succinctly, internally fogged elements.

The internally fogged elements are capable of producing a visible density when developed in an internal developer and are sufficiently free of surface fog that they produce a readily visually discernable lower density when developed in a surface developer as compared with an internal developer. For instance, the internally fogged silver halide elements are preferably capable of producing a density of at least 0.5, most preferably at least 1.0, when processed for 5 minutes in Reference Internal Developer A at 25° C. and when processed for 5 minutes in Reference Surface Developer B at 25° C. are preferably capable of producing a density of at least 0.2, most preferably at least 0.8, less than when comparably processed with Reference Internal Developer A. In a specifically preferred form the internally fogged elements are sufficiently free of surface fog that they produce a density of less than 0.1 when processed for 5 minutes in Reference Surface Developer B at 25° C.

| Reference Internal Developer A | |
|---|---|
| N-methyl-p-aminophenol sulfate | 2.5 g |
| Sodium sulfite, desiccated | 30 g |
| Hydroquinone | 2.5 g |
| Sodium metaborate | 19.0 g |
| Potassium bromide | 0.5 g |
| Potassium iodide | 0.5 g |
| Water to 1 liter | |
| Reference Surface Developer B | |
| N-methyl-p-aminophenol sulfate | 2.5 g |
| Sodium sulfite, desiccated | 30 g |
| Hydroquinone | 2.5 g |
| Sodium metaborate | 10.0 g |
| Potassium bromide | 0.5 g |
| Water to 1 liter | |

Internally fogged silver halide elements suitable for use in this process can be provided by the selection or modification of known silver halide photographic elements. For example, photographic elements which contain both surface-sensitive emulsions and internally fogged, internal latent image-forming emulsions are disclosed by Luckey et al U.S. Pat. Nos. 2,996,382, 3,178,282, 3,397,987 and 3,705,858; Luckey U.S. Pat. No. 3,695,881; *Research Disclosure*, Vol. 134, June 1975, Item 13452; Millikan et al Defensive Publication T-0904017, Apr. 21, 1972 and Kurz *Research Disclosure*, Vol. 122, June 1974, Item 12233. The surface-sensitive and internally fogged emulsions are blended or coated in separate layers. Where the coating coverage of the internally fogged emulsions is sufficient to provide a density of at least about 0.5 in Reference Internal Developer A, as described above, these photographic elements can be employed without further modification in this process. In a preferred form these photographic elements are modified to omit the surface-sensitive emulsions, since they do not contribute to imaging in the present process and offer the disadvantage of rendering the elements light-sensitive. It is preferred to increase the coating coverages of the internally fogged emulsions in these elements, since these emulsions are alone being relied upon to produce a visible image, rather than working in combination with the surface-sensitive emulsions in these elements are conventionally employed.

The internally fogged silver halide elements employed in this process can also be prepared merely by exposing conventional photographic elements of the type which form internal latent images, more succinctly designated internal latent image-forming elements. By uniform light exposure, for example, such conventional internal latent image-forming elements are converted to internally fogged elements. Conventional internal latent image-forming emulsions and photographic elements are illustrated by Davey et al U.S. Pat. No. 2,592,250; Porter et al U.S. Pat. Nos. 3,206,313 and 3,317,322; Evans U.S. Pat. No. 3,761,276; Miller U.S. Pat. No. 3,767,413 and Gilman et al U.S. Pat. No. 3,979,213. Berriman U.S. Pat. No. 3,367,778 discloses the formation of internal latent image-forming emulsions which can be employed in the practice of this invention, provided the step of surface fogging the grains is omitted.

Particularly preferred internal latent image-forming emulsions are those containing converted-halide grains, as described by Davey et al U.S. Pat. No. 2,592,250. The term "converted-halide silver halide grains" is employed herein as a recognized word of art denoting silver halide grains prepared by forming an emulsion of silver salt grains consisting at least partly of silver salt more soluble in water than silver bromide, and "converting" at least a portion of such grains to silver bromide or silver bromoiodide salts. The preferred converted-halide silver halide grains employed in the practice of this invention have a halide content of at least 50 mole percent, most preferably at least 80 mole percent, bromide and up to 10 mole percent, most preferably less than 5 mole percent, iodide, any remaining halide being chloride. Especially good results are obtained with converted-halide silver halide grains containing about 90 mole percent bromide and about 10 mole percent chloride.

The silver halide grains can be internally fogged as they are formed, but it is generally more convenient simply to expose the emulsions or elements with light after they are formed. In converting the conventional internal latent image-forming elements to internally fogged elements by light exposure it is preferred that exposures be sufficient to produce a maximum density when the elements are thereafter developed in an internal developer, such as in Reference Internal Developer A as described above. The internal latent image-forming elements are substantially free of surface fog, and, since they form internal latent images upon exposure, after light exposure and processing in a surface developer, such as Reference Surface Developer B as described above, they yield densities substantially below the preferred 0.1 minimum density levels. The foregoing density characteristics are, of course those which the emulsion layers exhibit prior to ultrasonic exposure.

One or more photographic vehicle materials (or, more succinctly, vehicles) are present in combination with the internally fogged silver halide grains to form the emulsion layer or layers of the elements. The vehicles are also present in layers, if any, which overlie the emulsion layers. The vehicles perform the various functions conventionally performed in photographic elements—e.g., peptizing and binding. The vehicles employed are those which are penetrable by conventional photographic processing liquids, such as developers. As employed in the practice of this invention the vehicles perform the additional function of acting as a barrier to impede diffusion of solute to the internally fogged silver halide grains in the absence of ultrasound.

It is generally preferred to employ hydrophilic colloids alone or in combination with other materials as vehicles. Suitable hydrophilic materials include both naturally occurring substances such as proteins, protein derivatives, cellulose derivatives—e.g., cellulose esters, gelatin—e.g., alkali-treated gelatin (cattle bone or hide gelatin) or acid-treated gelatin (pigskin gelatin), gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like as described in Yutzy et al U.S. Pat. Nos. 2,614,928 and 2,614,929, Lowe et al U.S. Pat. Nos. 2,691,582, 2,614,930, 2,614,931, 2,327,808 and 2,448,534, Gates et al U.S. Pat. Nos. 2,787,545 and 2,956,880, Himmelmann et al U.S. Pat. No. 3,061,436, Farrell et al U.S. Pat. No. 2,816,027, Ryan U.S. Pat. Nos. 3,132,945, 3,138,461 and 3,186,846, Dersch et al U.K. Pat. No. 1,167,159 and U.S. Pat. Nos. 2,960,405 and 3,436,220, Geary U.S. Pat. No. 3,486,896, Gazzard U.K. Pat. No. 793,549, Gates et al U.S. Pat. Nos. 2,992,213, 3,157,506, 3,184,312 and 3,539,353, Miller et al U.S. Pat. No. 3,227,571, Boyer et al U.S. Pat. No. 3,532,502, Malan U.S. Pat. No. 3,551,151, Lohmer et al U.S. Pat. No. 4,018,609, Luciani et al U.K. Pat. No. 1,186,790, U.K. Pat. No. 1,489,080 and Hori et al Belgian Pat. No. 856,631, U.K. Pat. No. 1,490,644, U.K. Pat. No. 1,483,551, Arase et al U.K. Pat. No. 1,459,906, Salo U.S. Pat. Nos. 2,110,491 and 2,311,086, Fallesen U.S. Pat. No. 2,343,650, Yutzy U.S. Pat. No. 2,322,085 Lowe U.S. Pat. No. 2,563,791, Talbot et al U.S. Pat. No. 2,725,293, Hilborn U.S. Pat. No. 2,748,022, DePauw et al U.S. Pat. No. 2,956,883, Ritchie U.K. Pat. No. 2,095, DeStubner U.S. Pat. No. 1,752,069, Sheppard et al U.S. Pat. No. 2,127,573, Lierg U.S. Pat. No. 2,256,720, Gaspar U.S. Pat. No. 2,361,936, Farmer U.K. Pat. No. 15,727, Stevens U.K. Pat. No. 1,062,116 and Yamamoto et al U.S. Pat. No. 3,923,517.

The element layers can also contain alone or in combination with hydrophilic water permeable colloids as vehicles or vehicle extenders (e.g., in the form of latices), synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides and the like as described in Hollister et al U.S. Pat. Nos. 3,679,425, 3,706,564 and 3,813,251, Lowe U.S. Pat. Nos. 2,253,078, 2,276,322, 2,276,323, 2,281,703, 2,311,058 and 2,414,207, Lowe et al U.S. Pat. Nos. 2,484,456, 2,541,474 and 2,632,704, Perry et al U.S. Pat. No. 3,425,836, Smith et al U.S. Pat. Nos. 3,415,653 and 3,615,624, Smith U.S. Pat. No. 3,488,708, Whiteley et al U.S. Pat. Nos. 3,392,025 and 3,511,818, Fitzgerald U.S. Pat. Nos. 3,681,079, 3,721,565, 3,852,073, 3,861,918 and 3,925,083, Fitzgerald et al U.S. Pat. No. 3,879,205, Nottorf U.S. Pat. No. 3,142,568, Houck et al U.S. Pat. Nos. 3,062,674 and 3,220,844, Dann et al U.S. Pat. No. 2,882,161, Schupp U.S. Pat. No. 2,579,016, Weaver U.S. Pat. No. 2,829,053, Alles et al U.S. Pat. No. 2,698,240, Priest et al U.S. Pat. No. 3,003,879, Merrill et al U.S. Pat. No. 3,419,397, Stonham U.S. Pat. No. 3,284,207, Lohmer et al U.S. Pat. No. 3,167,430, Williams U.S. Pat. No. 2,957,767, Dawson et al U.S. Pat. No. 2,893,867, Smith et al U.S. Pat. Nos. 2,860,986 and 2,904,539, Ponticello et al U.S. Pat. Nos. 3,929,482 and 3,860,428, Ponticello U.S. Pat. No. 3,939,130, Dykstra U.S. Pat. No. 3,411,911 and Dykstra et al Canadian Pat. No. 774,054, Ream et al U.S. Pat. No. 3,287,289, Smith U.K. Pat. No. 1,466,600, Stevens U.K. Pat. No. 1,062,116, Fordyce U.S. Pat. No. 2,211,323, Martinez U.S. Pat. No. 2,284,877, Watkins U.S. Pat. No. 2,420,455, Jones U.S. Pat. No. 2,533,166, Bolton U.S. Pat. No. 2,495,918, Graves U.S. Pat. No. 2,289,775, Yackel U.S. Pat. No. 2,565,418, Unruh et al U.S. Pat. No. 2,865,893 and 2,875,059, Rees et al U.S. Pat. No. 3,536,491, Broadhead et al U.K. Pat. No. 1,348,815, Taylor et al U.S. Pat. No. 3,479,186, Merrill et al U.S. Pat. No. 3,520,857, Bacon et al U.S. Pat. No. 3,690,888, Bowman U.S. Pat. No. 3,748,143, Dickinson et al U.K. Pat. Nos. 808,227 and 808,228, Wood U.K. Pat. No. 822,192 and Iguchi et al U.K. Pat. No. 1,398,055.

It is a significant advantage of this process that the internally fogged elements in their preferred form can be handled in room light and that no requirement of either exposing the elements to light or protecting the elements from ordinary room light, such as incandescent lighting, is imposed on the process. Thus, there is no requirement for darkroom processing, as is encountered commonly in photographic processing, nor is there any required light exposure step to complicate subsequent processing steps or the apparatus employed in their performance.

Although the foregoing discussion has been in terms of light exposure, it is appreciated that these comments are generally applicable to forms of electromagnetic radiation conventionally employed in the exposure of photographic elements. For example, in addition to light within the visible spectrum or within a selected portion thereof, other wavelengths of electromagnetic radiation, such as ultraviolet light, infrared radiation, X-rays and gamma rays, are particularly contemplated for converting internal latent image-forming silver halide photographic elements into internally fogged elements.

The internally fogged element is in contact during ultrasonic exposure with a transport liquid, which serves two distinct functions. First, the transport liquid acts as a medium for the transmission of ultrasound. It is generally recognized that liquids transmit ultrasonic energy more efficiently (that is, with less attenuation) than gaseous media. Second, the transport liquid serves as a reservoir for a solute which can be initially present in the internally fogged photographic element or the transport liquid.

The transport liquid is related to the internally fogged emulsion layer(s) of the element so that a diffusion path for the solute is available between the transport liquid and the internally fogged emulsion layer(s). This can be accomplished by relating the transport liquid and the internally fogged element in any conventional manner of bringing a developer solution into contact with a photographic element for purposes of photographic processing. In a simple form the transport liquid can be spread on the emulsion coated surface of the element by coating or laminating, or the element can be immersed in the transport liquid.

The specific choice of a transport liquid to be placed in contact with the internally fogged element will be influenced, of course, by the specific solute chosen. Where the solute is being transported in ionized form, it is preferred that the transport liquid be a polar solvent. Water is a preferred polar solvent for use in the practice of this process; however, any polar solvent or combination of polar solvents known to be compatible with the elements and solute can be employed. Exemplary useful polar solvents in addition to water include water-miscible alcohols, ketones and amides (e.g., acetone, phenol, ethyl alcohol, methyl alcohol, isopropyl alcohol, ethylene glycol, N,N-dimethylacetamide, and methyl ethyl ketone), tetrahydrofuran, N-methyl-2-pyrrolidone, dimethylsulfoxide and mixtures of the above, with or without water. Generally any transport liquid can be employed which is chemically compatible with the solute and the internally fogged element.

Any solute can be employed in the practice of this invention which, following contact with the internally fogged silver halide grains, is capable of rendering them developable in a surface developer, such as Reference Surface Developer B. As recognized by Luckey et al in the various patents cited above, iodide ions are particularly effective in rendering internally fogged silver halide grains developable in a surface developer. It is known that silver iodide has a solubility product constant which is approximately two orders of magnitude less than that of silver bromide and approximately four orders of magnitude less than that of silver chloride. On the other hand, photographic silver halide emulsions conventionally contain less than about 20 (typically less than 10) mole percent silver iodide, based on total silver halide. What is believed to occur when a photographic silver halide is brought into contact with iodide ions in the presence of a transport liquid is that the iodide ions displace the bromide and/or chloride atoms in the silver halide crystal lattice so that the much less soluble silver iodide is formed. The iodide ions, being much larger than the bromide and/or chloride atoms which they displace in the crystal lattice, disrupt the crystal structure to the extent of opening the interior of the silver halide grains to contact with a surface developer. Any convenient source of iodide ions can be employed as a solute in the practice of this process. Where the transport liquid is water or an aqueous medium, water soluble iodide salts can be employed, such as alkali iodides—e.g., sodium iodide, potassium iodide and lithium iodide. While suitable iodide ion concentrations under varied conditions can be readily ascertained, as described below, it is typically preferred to employ iodide ion concentrations of from about 100 to 1000, preferably 200 to 800, milligrams per liter of transport liquid. If the iodide solute is incorporated in the element, it should be coated in a layer separate from the internally fogged silver halide emulsion layer.

Known silver halide solvents can also be employed as solutes in the practice of this process. Water soluble thiosulfates constitute a specifically preferred class of silver halide solvents. Water soluble thiosulfates, particularly ammonium and alkali metal thiosulfates, such as sodium and potassium thiosulfates, are commonly incorporated in silver halide developers to provide the capability of developing internal latent images. Thiosulfate concentrations in the transport liquid are preferred corresponding to the concentrations in which thiosulfates are conventionally incorporated in internal silver halide developers.

Another class of silver halide solvents are water soluble sulfur-containing compounds of the type which have been conventionally employed as ripening agents when employed in the formation of silver halide emulsions. Such sulfur-containing compounds include water-soluble thioethers and thiocyanates.

Conventional thioethers, such as those disclosed in MacBride U.S. Pat. No. 3,271,157 as ripening agents, here incorporated by reference, can be employed. Certain of the preferred organic thioether silver halide solvents can be represented by the formulas:

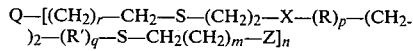

and

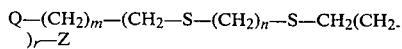

wherein: r and m are integers of 0 to 4; n is an integer of 1 to 4; p and q are integers of 0 to 3; X is an oxygen atom (—O—), a sulfur atom (—S—), a carbamyl radical

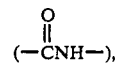

a carbonyl radical

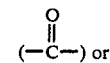

a carboxy radical

R and R' are ethylene oxide radicals (—O—CH$_2$CH$_2$—); Q and Z are hydroxy radicals (—OH), carboxy radicals, or alkoxy radicals (—O—alkyl) wherein the alkyl group has 1 to 5 carbon atoms; and Q and Z can also be substituents described for X linked to form a cyclic compound.

Preferred organic thioether silver halide solvents include compounds represented by the formulas:

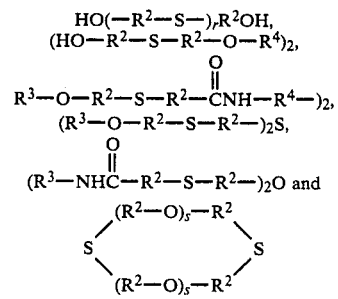

wherein: r is an integer of 1 to 3; s is an integer of 1 to 2; R$^2$ is an alkylene radical having 1 to 5 carbon atoms and is preferably ethylene (—CH$_2$CH$_2$—); R$^3$ is an alkyl radical having 1 to 5 carbon atoms and is preferably ethyl; and R$^4$ is an alkylene radical having 1 to 5 carbon atoms and is preferably methylene (—CH$_2$—).

As an alternative to thioether silver halide solvents, thiocyanate salts can be used, such as alkali metal, most commonly potassium, and ammonium thiocyanate salts. Conventional thiocyanates can be employed, such as those disclosed in Nietz and Russell, U.S. Pat. No. 2,222,264, Lowe et al U.S. Pat. No. 2,448,534, and Illingsworth U.S. Pat. No. 3,320,069, as ripening agents.

Another useful class of silver halide solvents are pyridinium salts, such as those disclossed by Welliver et al U.S. Pat. No. 2,648,604. The preferred pyridinium salts to be employed can be represented by the following general formula:

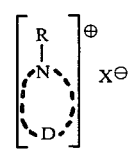

wherein D represents the atoms necessary to complete an unsubstituted pyridinium nucleus, an alkoxy-substituted pyridinium nucleus, e.g., a 2-methoxy-, 3-methoxy-, 4-methoxy-, 2-ethoxy, 3-ethoxy, 2,4-dimethoxy-, 2,4-diethoxy-, 2,5-diethoxy-, or 3,5-diethoxy-pyridinium nucleus; a picolinium nucleus, e.g., a 4-methyl, 2-methyl-, or 3-methyl-pyridinium nucleus; a lutidinium nucleus, e.g., a 2,3-dimethyl-, 2,4-dimethyl-, 2,5-dimethyl-, 2,6-dimethyl-, 3,4-dimethyl-, 3,5-dimethyl-, 2-ethyl-, 3-ethyl- or 4-ethyl-pyridinium nucleus; a collidinium nucleus, e.g., a 2-propyl-, 2-isopropyl-, 4-methyl-2-ethyl-, 4-methyl-3-ethyl-, 2-methyl-4-ethyl-, 2-methyl-5-ethyl-, 2-methyl-6-ethyl-, 2,3,4-trimethyl-, or 2,3,6-trimethyl-pyridinium nucleus, or a parvolinium nucleus, e.g., a 2-butyl-, 2-isobutyl-, 3,5-dimethyl-2-ethyl-, 2,6-dimethyl-3-ethyl-, 2,6-dimethyl-4-ethyl-, 2,4-diethyl- or 3,4-diethylpyridinium nucleus; wherein R is a short chain aliphatic radical having not more than 5 carbon atoms, such as alkyl, e.g., methyl, ethyl, propyl, butyl or amyl; chloro- or bromoalkyl, e.g., β-chloroethyl, β-bromoethyl, γ-chloropropyl or γ-bromopropyl; hydroxyalkyl, e.g., β-hydroxyethyl, β-hydroxypropyl, or β,γ-dihydroxypropyl, carboxymethyl; carbalkoxymethyl, e.g., carbomethoxymethyl, carbethoxymethyl or carbopropoxymethyl, carboxamidomethyl; N-substituted carboxamidomethyl, e.g., N,N-dimethylcarboxamidomethyl; alkoxyalkyl, e.g., methoxymethyl, ethoxymethyl, ethoxyethyl or propoxymethyl; and wherein X represents an anion selected from the group consisting of chloride, bromide thiocyanate, methylsulfate and thiocyanate.

The following is an illustrative listing of pyridinium salts which may be employed for the purpose herein set forth:
1-methylpyridinium chloride
1-ethylpyridinium bromide
1-(β-chloroethyl)pyridinium chloride
1-(1-β-bromoethyl)pyridinium bromide
1-propylpyridinium bromide
1-(β-hydroxyethyl)pyridinium chloride
1-methoxymethylpyridinium bromide
1-ethoxymethylpyridinium bromide
1-propoxymethylpyridinium bromide
1-(β-acetoxyethyl)pyridinium chloride
1-(β,γ-dihydroxypropyl)pyridinium chloride
1-carboxymethylpyridinium chloride
1-carboxymethylpyridinium bromide
1-carboxymethoxymethylpyridinium bromide
1-carbethoxymethylpyridinium chloride
1-methyl-2-methylpyridinium chloride
1-methyl-2-methylpyridinium bromide
1-methyl-3-methylpyridinium bromide
1-methyl-4-methylpyridinium bromide
1-ethyl-2-methylpyridinium bromide
1-ethyl-4-methylpyridinium bromide
1-carboxymethyl-2-methoxypyridinium bromide
1-carboxymethyl-3-methylpyridinium chloride
1-carboxymethyl-2-methylpyridinium chloride
1-carboxymethyl-2-methylpyridinium thiocyanate
1-carbethoxymethyl-3-picolinium chloride
1-methyl-3-ethylpyridinium chloride
1-carboxymethyl-3-ethylpyridinium chloride
1-(β-hydroxyethyl)-2-methylpyridinium bromide
1,2,3-trimethylpyridinium methosulfate
1,2,4-trimethylpyridinium methosulfate
1,2,5-trimethylpyridinium methosulfate
1,2,6-trimethylpyridinium methosulfate
1,3,5-trimethylpyridinium methosulfate
1-ethyl-2,3-dimethylpyridinium ethosulfate
1-ethyl-2,4-dimethylpyridinium ethosulfate
1-ethyl-2,5-dimethylpyridinium ethosulfate
1-ethyl-2,6-dimethylpyridinium ethosulfate
1-ethyl-3,5-dimethylpyridinium ethosulfate
1-methyl-2-propylpyridinium chloride
1-methyl-2-isopropylpyridinium bromide
1-hydroxyethyl-2-methyl-5-ethylpyridinium chloride
1,5-diethyl-2-methylpyridinium bromide
1,4-dimethyl-3-ethylpyridinium bromide
1,2,4,6-tetramethylpyridinium bromide
1-methyl-2-methoxypyridinium methosulfate
1-ethyl-3-methoxypyridinium ethosulfate
1-ethyl-3-methoxypyridinium bromide
1-carboxymethyl-2-ethoxypyridinium chloride
1-carboethoxymethyl-2-ethoxypyridinium chloride
1-methyl-2,4-dimethoxypyridinium methosulfate
1-acetamido-2,4-diethoxypyridinium chloride
1-ethyl-2,5-diethoxypyridinium ethosulfate
1-carbethoxymethyl-3,5-diethoxypyridinium chloride In addition to the use of thioethers, thiosulfates, thiocyanates and pyridinium salts as silver halide solvents, soluble sulfite salts, such as alkali sulfite salts, in the presence of ultrasound are useful solvents for high chloride silver halide grains. Higher chloride silver halide grains are those which are greater than 50 mole percent chloride, based on total halide. However, sulfite solutes are not effective solvents for silver bromide and silver bromoiodide grains.

The internally fogged element, in association with the transport liquid and solute, is imagewise exposed to ultrasonic radiation. This can be accomplished using any conventional sonographic camera which is capable of impinging ultrasonic radiation on the element as an image receptor. In such a sonic camera a sonic source or transducer (i.e., an emitter of ultrasonic radiation) and the element are spatially related so that the ultrasonic radiation, unless interrupted, can impinge on the silver halide emulsion layer(s) to be imagewise exposed. Between the sonic transducer and the internally fogged element is interposed any means which will imagewise modulate the ultrasonic radiation as it is received by the emulsion layer(s). In a simple form this can take the form of an apertured template which absorbs or reflects the ultrasonic radiation which strikes it and allows a portion of the ultrasonic radiation to pass through the aperture to the element. Alternatively the reflected ultrasonic radiation can be caused to impinge on the element. In a more sophisticated form the imaging means can include combinations of sonic lenses and reflectors for focusing and directing the ultrasonic radiation. In one application of this process an object whose ultrasonic modulation characteristic is desired to be recorded is placed in the sonographic camera so that it intercepts ultrasonic radiation passing from the sonic transducer to the element. For example, the ultrasonoscope of Brenden, cited above, can be readily adapted for use as a sonic camera in the practice of this invention merely by locating the internally fogged element in one of the water tanks so that it is impinged by the ultrasonic radiation which has passed through or been reflected by the mamma under examination.

In a simple mode of practicing this process, a single transport liquid is in contact with the sonic transducer and the internally fogged element and provides a medium for transmission of ultrasound therebetween. In an alternative form the sonic transducer can be contacted with one transport liquid and a second transport liquid can be in contact with the internally fogged element with an ultrasonically transmitting partition, such as a membrane, separating the two transport media. In still another form the solute and a first transport liquid can be entirely within the emulsion layer(s) to be imagewise exposed and a second transport liquid which is chemically compatible with the internally fogged element can be placed in contact therewith to permit ultrasonic exposure. For example, a polar solvent containing the solute can be imbibed into or coated on the emulsion layer to be exposed and then the internally fogged element immersed in a nonpolar liquid, such as cyclohexane, benzene, etc.

Except where rapid alteration of the developability as a function of association with the transport liquid and solute prohibits, it is usually preferred to allow the element at least a few seconds, preferably at least about 5 seconds, of contact with the transport liquid before initiating ultrasonic exposure. It is specifically contemplated to bring the internally fogged element into contact with the transport liquid first and then later to add the solute to the transport liquid reservoir. Delaying ultrasonic exposure after initial contact with the transport liquid can be used to enhance ultrasonographic response. The optimum delay period for a particular element can be correlated to the contact period at which incipient alteration of the developability of the element is observed in the solute selection test. For some elements alteration of developability begins immediately upon association with the transport liquid and solute, and there is no advantage to delaying the ultrasonic exposure.

Some elements, such as those having film supports, directly absorb only a very small fraction of the total ultrasonic radiation to which they are exposed, the rest passing directly through the element. Accordingly, it is possible during ultrasonic exposure to orient an internally fogged film element so that either the emulsion layer bearing surface or the film support of the element is nearest to the sonic radiation source. Also, one or a plurality of imaging emulsion layers can be coated on either or both major surfaces of the film support and concurrently exposed. Further, it is possible to stack two or more film elements so that ultrasonic radiation passes through them sequentially during exposure. Of course, where precise focusing of the ultrasonic radiation is desired, the number of film elements which will produce optimum images may be limited. By the way of contrast, photographic paper supports absorb almost all of the ultrasonic imaging radiation to which they are exposed according to this process. For elements having paper supports the silver halide emulsion layer must be on the side nearest to the source of the ultrasonic radiation source. Generally better image quality is obtained in all instances where the emulsion layer is on the face of the support nearest the ultrasonic energy source.

Imagewise exposure of the internally fogged element in the sonographic camera is at an intensity and for a duration which is insufficient to produce a developable image in the absence of the solute. The level of ultrasonic exposure is lower than that which has been recognized in the art to produce ultrasonic images in the absence of light or to render imagewise developable surface fogged silver halide elements. That is, the ultrasonic imaging exposure is itself insufficient to produce a variation in the development of the internally fogged emulsion layer(s) of the element being exposed in the absence of the solute. Successful imaging is readily achieved at ultrasonic exposures below 100 watt-sec/cm$^2$ by this process.

Just as different photographic elements exhibit marked differences in their sensitivity to electromagnetic exposure, different internally fogged elements will also exhibit different sensitivities to ultrasonic radiation. By exposing internally fogged elements to differing ultrasonic intensities and then performing the photographic processing steps intended for use, the optimum ultrasonic exposure for a given internally fogged element can be readily determined. In a manner analogous to light sensitometry using a step tablet, it is possible to expose an internally fogged element simultaneously in offset areas with an array of laterally spaced sonic transducers which are calibrated to transmit ultrasonic radiation at predetermined stepped levels of intensity. Upon photographic processing, densities produced by each transducer can be plotted against ultrasonic exposure. This generates an ultrasonic characteristic curve for the particular internally fogged element from which the optimum intensity of ultrasonic exposure can be readily determined.

The determination can be repeated using differing durations of ultrasonic exposure, if desired, although this is not usually necessary. In using photographic cameras varied shutter speeds (exposure times) and f-stop settings (exposure intensities) are available to the photographer to achieve a given exposure, since exposure is recognized to be the mathematical product of exposure time and intensity. The proposition that equal photograhic exposures differing in intensity and duration produce similar photochemical response is referred to as the photographic reciprocity law, and this law is generally relied upon in photography in varying exposure times and intensities, although it is recognized that many photographic elements exhibit significant reciprocity law failure. By analogy to photography, various combinations of ultrasonographic exposures as a mathematical product can be relied upon in a general way in accordance with a reciprocity law of ultrasonic exposure which is analogous to the photographic reciprocity law.

Any ultrasonic frequency heretofore employed in ultrasonography can be applied to the practice of this process. For a given transport liquid the wavelength of the ultrasonic radiation is reciprocally related to its frequency. Since best imaging results in ultrasonography and ultrasonoscopy are recognized to be obtainable when the wavelength of the ultrasonic imaging radiation is substantially shorter than the dimension of the object or object feature to be imaged, it is generally preferred to operate at shorter wavelengths and hence higher frequencies. For example, at a frequency of 1 megahertz ultrasonic radiation transmitted in water exhibits a wavelength in the order of 1.5 millimeters. Accordingly, in obtaining ultrasonographs of objects or object features of about 1.5 millimeters in dimesnion it is preferred to operate substantially above 1 megahertz, typically in the range of 2.5 to 100 megahertz. Frequencies in the order of gigahertz are known in the art and can be employed, particularly when microscopic image definition is required. The high operating frequencies are, of course, advantageous since they effectively define both large and small objects and object features, although increased absorptivity of many materials at higher frequencies requires thinner object samples. In the prior art ultrasonic exposures of photographic elements have most typically occurred at lower frequencies in order to stimulate cavitation. This process is not similarly limited.

The ultrasonic exposure of the photographic element can be constant in intensity for the duration of exposure or it can be varied in intensity. Pulsing of the ultrasonic exposure can be achieved by continuously modulating the intensity of exposure or, preferably, interrupting ultrasonic exposure so that ultrasonic exposure is divided into separate bursts or discrete pulses. It is contemplated to employ discrete pulses wherein the duration of the pulses and the interval therebetween is less than a tenth of a second. The duration of the ultrasonic pulse and the interval between pulses can be varied independently, if desired. The minimum useful pulse and interval durations are limited only by the capabilities of the ultrasonic emitters selected for use. Naturally, as the pulses and intervals between pulses approach the frequency of the ultrasonic radiation, continuous exposure will be approached as a limit.

In one specifically contemplated form of this process the internally fogged element is associated with the transport liquid and solute, ultrasonically imagewise exposed and then developed in a surface developer. Development preferentially occurs in ultrasonically exposed areas to produce a negative ultrasonic image. In one preferred form the transport liquid is water, and the solute is dissolved in the water or is incorporated in the element, such as in an overcoat layer. In a specifically preferred form the internally fogged element is immersed in a bath which consists essentially of water and the solute, which can be diffusing into or out of the element during ultrasonic exposure. In an alternative form a conventional viscosity increasing agent can be added to the transport liquid, and it can be spread as a layer on the internally fogged element.

The term "surface developer" is employed in its art recognized usage to indicate developers which are capable of developing silver halide grains containing a surface latent image or surface fog, but not silver halide grains containing only an internal latent image or internal fog. The surface developers can generally utilize any of the silver halide developing agents, but the developer solution is sufficiently free of water soluble iodide salts, water soluble thiocyanates, thioethers, thiosulfates and pyridinium salts and any other solute which will disrupt or dissolve silver halide grains to avoid revealing an internal latent image or internal fog during the contemplated time of development.

In the foregoing mode of practicing this process, referred to as a sequential mode, in which ultrasonic exposure occurs in the presence of a transport liquid and a solute, but in the absence of a silver halide developing agent, and the ultrasonically exposed element is thereafter developed in a surface developer, some distinct advantages are achieved. First, surface development is substantially limited to those areas of the internally fogged element which have been ultrasonically exposed. This is in direct contrast to obtaining differential development of a surface fogged silver halide element as a result of imagewise ultrasound exposure. In the latter instance silver halide development occurs in both ultrasonically exposed and background areas. In the sequential mode of practicing this process a relatively low minimum density level in unexposed areas is obtainable, since the internal fog sites within the silver halide grains are not accessible to the surface developer. Further, there is no necessity of arresting development before maximum image densities are obtained in order to avoid elevated minimum densities. Finally, it is a surprising feature of this process that development of the internally fogged element to produce a viewable image can be achieved using a surface developer. The ability of imagewise ultrasound exposure in the presence of a transport liquid and a solute to render the internally fogged element capable of being developed in a surface developer, particularly at the low ultrasonic energy levels employed, has never before been recognized as possible or achieved by those skilled in the art.

In the sequential mode the surface developer is not brought into contact with the internally fogged element until ultrasonic imagewise exposure is completed. It has been observed that a significant increase in the imaging sensitivity of this process is achieved if development follows ultrasonic exposure. Specifically, it has been observed that a significant enhancement in density differences between ultrasonically exposed and background areas can be achieved when development is delayed from about 10 to 200 seconds (optimally from about 15 to 50 seconds) following ultrasonic exposure at ordinary room temperature (20° to 25° C.). This enhancement of the ultrasonographic image is attributed to a furtherance during the delay period of the alterations of the internally fogged element initiated by ultrasonic exposure.

In an alternative form of this process the internally fogged silver halide element is imagewise ultrasonically exposed while in contact with an internal developer. Internal developers are those capable of developing silver halide grains which contain only an internal latent image or internal fog. One conventional approach of ascertaining if a developer is an internal developer is to light expose an internal latent image-forming silver halide emulsion and then to bleach the surface of silver halide grains to remove any surface fog. If the developer is capable of producing a substantial density by development of surface bleached silver halide grains, it is an internal developer. In quantitative terms, preferred internal developers are those which produce a density of at least 0.5 within 5 minutes at 25° C. in a silver halide element useful in the practice of this process which has been light exposed to provide a maximum density and then bleached for 5 minutes at 25° C. in a 0.3 percent aqueous solution of potassium ferricyanide. Conversely, developers which fail to produce a density of at least 0.5, preferably 0.1 are preferred surface developers. Among the advantages of imagewise ultrasonic exposure in the presence of an internal developer are that imaging can be readily achieved with minimal ultrasonic energy levels and only a single processing solution is employed for both ultrasonic exposure and development. However, care must be exercised to avoid extended contact of the element with the internal developer, since this can result in background fog.

In another sequential form of this process the internally fogged silver halide element is imagewise ultrasonically exposed in a silver halide solvent as described above, such as a thioether, thiosulfate, thiocyanate or, in the case of high chloride silver halide grains, a sulfite, and in the absence of a developer. By increasing the solvent action on the silver halide grains being ultrasonically exposed, such as by using higher ultrasonic energy levels, longer exposure periods, higher solute concentrations or some combination of these, the silver halide grains in ultrasonically exposed areas can be substantially entirely dissolved. In areas where ultrasonic exposure does not occur the silver halide grains may be unaffected by the silver halide solvent or, preferably, the silver halide grains can be sufficiently modified by the solvent that they become developable in a surface developer. In the former case the silver halide grains are thereafter developed in an internal developer while in the latter case the silver halide grains can thereafter be developed in either a surface or an internal developer. Development produces little or no density in ultrasonically exposed areas, since the silver halide in exposed areas has been dissolved and removed, whereas the developer readily develops the internally fogged silver halide grains in the areas which are not ultrasonically exposed. The result is a reversal or positive image—that is, a maximum density is produced in areas of the elements which are not ultrasonically exposed. By carefully limiting both the degree of silver halide dissolution in the ultrasonic exposure step and the development step, it is possible alternatively to produce a negative image by this process mode, but such a form of the invention is not preferred, since high background densities are to be expected.

This process can be practiced with any conventional surface or internal developer. The surface developers can be converted to internal developers by incorporating silver halide solvents, such as thioethers, thiosulfates and thiocyanates, water soluble iodide salts or, in the case of high chloride silver halides, water soluble sulfites in the solute concentrations disclosed above or as ascertained by the solute selection test procedures.

It should be pointed out that while ultrasonic exposure times can be quite low, in the order of a few seconds or less, once the internal fog within the silver halide grains has been revealed by the action of ultrasonic exposure acting in conjunction with the transport liquid and solute, the rates of development are those that would be expected from a knowledge of photographic development procedures. Accordingly, in the modes of ultrasonic exposure in the presence of a developer, it is apparent that ultrasonic exposure will be completed well before optimum development of the elements has been achieved. Because ultrasonic exposure periods will ordinarily be so low as to be negligible in comparison with total development times, development periods in both the sequential and concurrent exposure-development modes will typically be those experienced in conventional photographic development, typically from about 30 seconds to about 10 minutes, most commonly from about 1 to 5 minutes.

An optimum imaging response for any specific system described above can be achieved by routine adjustments. For example, the solubility of silver chloride is higher than that of silver bromide which is in turn higher than that of silver iodide, and this permits weaker silver halide solvents and/or lower solvent concentrations to be employed with silver chlorides than with silver bromides and silver bromoiodides. In addition to the variance in the activity levels of silver halide solvents, there is a wide variance in the activity levels of silver halide solvents. The choice and concentration levels of the silver halide solvents are also influenced by whether a negative ultrasonographic image is being formed, in which instance the silver halide solvent acts in ultrasonically exposed areas to reveal the internal fog sites in the silver halide grains, or a positive ultrasonographic image is being formed, in which instance the solvent acts to dissolve the silver halide grains in exposed areas. For negative-working ultrasonographic imaging it is preferred to employ silver halide solvents such as thioethers, thiosulfates, thiocyanates and pyridinium salts of the type described in concentrations of from 0.1 to 30 grams per liter of transport liquid, with concentrations of from 0.5 to 5.0 grams per liter being specifically preferred for thiosulfates and concentrations of from 5 to 15 grams per liter being specifically preferred for thiocyanates. Higher concentration levels can be employed in producing positive ultrasonographic images with these solvents. For sulfite solutes negative ultrasonographic images in silver chloride emulsions can be obtained with preferred concentrations in the range of from 10 to 50 grams per liter, while positive ultrasonographic images can be obtained with preferred concentrations in the range of from 80 to 100 grams per liter.

The preferred solute concentration ranges set forth above assume conventional ratios of the internally fogged silver halide grains to vehicles, typically in the range of from about 1:2 to 2:1, on a weight basis. Since the vehicle provides an impedance to the diffusion of the solute, it is apparent that adjustment of the proportion of the vehicle and its permeability, as by hardening, can be relied upon to control the diffusion rate of the solute, or, conversely, the concentration of the solute can be varied to adjust the rate of response of a selected internally fogged element. For example, if an internally fogged element responds too rapidly to the solute for convenient handling, its rate of response can be decreased merely by overcoating the emulsion layer with a vehicle overcoat or by reducing the concentration of the solute in the transport liquid.

A preferred negative-working system will, in the absence of ultrasound, within a period of from 10 seconds to 10 hours of contact with the transport liquid containing the solute cause the internally fogged element to produce a density of at least 0.5, preferably at least 1.0, when thereafter developed in a surface developer, such as Reference Surface Developer B, for 5 minutes at 25° C. If the density is achieved in less than 10 seconds in the absence of ultrasound, reproducible imaging will be difficult without obtaining high background densities or without employing high speed transport equipment for bringing the internally fogged element into and out of contact with the solute, although this is, of course, possible. On the other hand, if a density of at least 0.5 is not obtained within 10 hours following contact of the solute with the internally fogged element, the process will be unattractively slow when ultrasound is employed at lower power levels, such as are preferred in the practice of this process.

Similarly, a preferred positive-working system will, in the absence of ultrasound, within a period of from 10 seconds to 10 hours of contact with the transport liquid containing the solute cause the internally fogged element to produce a density of at least 0.5 less, preferably at least 1.0 less, when thereafter developed in an internal developer, such as Reference Internal Developer A, for 5 minutes at 25° C., than the density produced in an identical element which is otherwise similarly processed, but which is not placed in contact with the transport liquid containing the solute.

It is recognized that in at least some instances identical elements can be used to produce either positive or negative ultrasonographic images, merely by adjusting solute concentrations and/or ultrasonic exposure levels, and the very same solute concentrations and ultrasonic exposure levels can produce either positive or negative ultrasonographic images by varying the silver halide and/or vehicle of the internally fogged elements being employed.

While the foregoing discussion is considered sufficient to describe the essential features of this process to those having ordinary skill in the art, it is appreciated that these essential features in ordinary applications will, in many instances, be employed in combination with features well known to those skilled in the photographic and ultrasonic arts. To illustrate further the applications of this process certain exemplary conventional features recognized to be useful in this process are more specifically discussed below.

It is specifically recognized that the internally fogged elements employed, particularly the silver halide emulsion layers thereof employed in imaging, can be protected against the production of surface fog. Conventional antifoggants and stabilizers, which can be used alone or in combination include the thiazolium salts described in Brooker et al. U.S. Pat. No. 2,131,038 and Allen et al U.S. Pat. No. 2,694,716; the azaindenes described in Piper U.S. Pat. No. 2,886,437 and Heimback et al U.S. Pat. No. 2,444,605; the mercury salts as described in Allen et al U.S. Pat. No. 2,728,663; the urazoles described in Anderson et al U.S. Pat. No. 3,287,135; the sulfocatechols described in Kennard et al U.S. Pat. No. 3,236,652; the oximes described in Carroll et al British Pat. No. 623,448; nitron; nitroindazoles; the mercaptotetrazoles described in Kendall et al U.S. Pat. No. 2,403,927, Kennard et al U.S. Pat. No. 3,266,897 and Luckey et al U.S. Pat. No. 3,397,987; the polyvalent metal salts described in Jones U.S. Pat. No. 2,839,405; the thiuronium salts described in Herz U.S. Pat. No. 3,220,839 and the palladium, platinum and gold salts described in Trivelli et al U.S. Pat. No. 2,566,263 and Yutzy U.S. Pat. No. 2,597,915.

The viewable image produced in each of the various modes of practicing this process can be either a silver image, a dye image or a combination of both. Dye images can be formed through the use of a color developer composition and color couplers, for example. The color couplers can be incorporated in either the developer composition, as in the case of mobile couplers, or in the ultrasonographic element, as in the case of ballasted couplers. Ballasted couplers are typically incorporated directly in the imaging silver halide emulsion layer or in a layer adjacent thereto. Generally any color image-forming approach which makes use of a silver image can be employed in the practice of my process. Color materials are discussed, for example, in paragraph XXII *Color materials, Product Licensing Index*, Vol. 92, December 1971, publication 9232. Both *Product Licensing Index* and *Research Disclosure* are published by Industrial Opportunities, Homewell, Havant Hamsphire, PO9 1EF, United Kingdom.

It is specifically contemplated that the elements can produce dye images through the selective removal of dyes. Negative or positive dye images can be produced by the immobilization or mobilization of incorporated color-providing substances as a function of exposure and development, as illustrated by Friedman U.S. Pat. No. 2,543,691, Whitmore U.S. Pat. No. 3,227,552, Bloom U.S. Pat. No. 3,443,940, Morse U.S. Pat. No. 3,549,364, Cook U.S. Pat. No. 3,620,730, Danhauser U.S. Pat. No. 3,730,718, Staples U.S. Pat. No. 3,923,510, Oishi et al U.S. Pat. No. 4,052,214, Fleckenstein et al U.S. Pat. No. 4,076,529 and U.K. Pat. Nos. 1,456,413, 1,479,739, 1,475,265 and 1,471,752.

The internally fogged elements can contain hardeners for the hydrophilic colloid layers, as described in paragraph VII *Hardeners;* plasticizers, lubricants, coating aids and matting agents, as described in paragraphs XI *Plasticizers and lubricants,* XII *Coating aids,* and XIII *Matting agents, Product Licensing Index,* publication 9232, cited above.

The photographic layers, including the silver halide emulsion layers and other layers of the elements can be coated on a wide variety of supports. Typical supports include cellulose nitrate film, cellulose acetate film, poly(ethylene terephthalate)film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

In the foregoing discussion of processing the internally fogged elements a number of techniques and procedures well known in photographic processing are not specifically discussed, but can be employed. For example, the pH of the developer can be reduced to stop development, as by the use of a conventional stop bath. Where a surface developer is employed, pH reduction to stop development can be readily omitted without adverse effect in most instances. Where a dye image is formed, the silver image in the photographic element can be removed by bleaching or blixing. While fixing of the silver halide can be undertaken, the lack of light sensitivity of the silver halide in most instances renders this step unnecessary. Processing formulations and techniques are described in L. F. Mason, *Photographic Processing Chemistry,* Focal Press, London, 1966; *Processing Chemicals and Formulas,* Publication J-1, Eastman Kodak Company, 1973; *Photo-Lab Index, Morgan and Morgan, Inc., Dobbs Ferry, New York,* 1977, and *Neblette's Handbook of Photography and Reprography—Materials, Processes and Systems,* VanNostrand Reinhold Company, 7th Ed., 1977.

Included among the processing methods are web processing, as illustrated by Tregillus et al U.S. Pat. No. 3,179,517; stabilization processing, as illustrated by Herz et al U.S. Pat. No. 3,220,839, Cole U.S. Pat. No. 3,615,511, Shipton et al U.K. Pat. No. 1,258,906 and Haist et al U.S. Pat. No. 3,647,453; monobath processing as described in Haist, *Monobath Manual,* Morgan and Morgan, Inc., 1966, Schuler U.S. Pat. No. 3,240,603, Haist et al U.S. Pat. Nos. 3,615,513 and 3,628,955 and Price U.S. Pat. No. 3,723,126; infectious development, as illustrated by Milton U.S. Pat. Nos. 3,294,537, 3,600,174, 3,615,519 and 3,615,524, Whiteley U.S. Pat. No. 3,516,830, Drago U.S. Pat. No. 3,615,488, Salesin et al U.S. Pat. No. 3,625,689, Illingsworth U.S. Pat. No. 3,632,340, Salesin U.K. Pat. No. 1,273,030 and Salesin U.S. Pat. No. 3,708,303; hardening development, as illustrated by Allen et al U.S. Pat. No. 3,232,761; roller transport processing, as illustrated by Russell et al U.S. Pat. Nos. 3,025,779 and 3,515,556, Masseth U.S. Pat. No. 3,573,914, Taber U.S. Pat. No. 3,647,459 and Rees et al U.K. Pat. No. 1,269,268; alkaline vapor processing, as illustrated by *Product Licensing Index,* Vol. 97, May 1972, Item 9711, Goffe et al U.S. Pat. No. 3,816,136 and King U.S. Pat. No. 3,985,564; metal ion development as illustrated by Price, *Photographic Science and Engineering,* Vol. 19, Number 5, 1975, pp. 283–287 and Vought, *Research Disclosure*, Vol. 150, October 1976, Item 15034; reversal processing, as illustrated by Henn et al U.S. Pat. No. 3,576,633; and surface application processing, as illustrated by Kitze U.S. Pat. No. 3,418,132.

Dye images which correspond to the silver halide rendered selectively developable by imagewise exposure, typically negative dye images, can be produced by processing, as illustrated by the Kodacolor C-22 the Kodak Flexicolor C-41 and the Afgacolor processes described in *British Journal of Photography Annual*, 1977, pp. 201–205. The photographic elements can also be processed by the Kodak Ektaprint-3 and -300 processes as described in Kodak Color Dataguide, 5th Ed., 1975, pp. 18–19, and the Agfa color process as described in *British Journal of Photography Annual*, 1977, pp. 205–206.

The photographic elements can be processed in the presence of reducible species, such as transition metal ion complexes (e.g. cobalt(III) and ruthenium(III) complexes containing amine and/or ammine ligands) and peroxy compounds (e.g. hydrogen peroxide and alkali metal perborates and percarbonates).

Dye images can be formed or amplified by processes which employ in combination with a dye-image-generating reducing agent an inert transition metal ion complex oxidizing agent, as illustrated by Bissonette U.S. Pat. Nos. 3,748,138, 3,826,652, 3,862,842 and 3,989,526 and Travis U.S. Pat. No. 3,765,891, and/or a peroxide oxidizing agent, as illustrated by Matejec U.S. Pat. No. 3,674,490, *Research Disclosure*, Vol. 116, December 1973, Item 11660, and Bissonette, *Research Disclosure*, Vol. 148, August 1976, Items 14836, 14846 and 14847. The photographic elements can be particularly adapted to form dye images by such processes, as illustrated by Dunn et al U.S. Pat. No. 3,822,129, Bissonette U.S. Pat. Nos. 3,834,907, 3,847,619 and 3,902,905 and Mowrey U.S. Pat. No. 3,904,413.

The presence of transition metal ion complexes can accelerate silver halide development, as illustrated by Bissonette U.S. Pat. No. 3,748,138, Beavers U.S. Pat. No. 3,901,712 and Price U.S. Pat. No. 3,964,912; can bleach silver images, as illustrated by Bissonette U.S. Pat. No. 3,923,511 and *Research Disclosure*, Item 14846, and can be employed to form tanned colloid images, as illustrated by Bissonette U.S. Pat. No. 3,856,524 and McGuckin U.S. Pat. No. 3,862,855.

The developers and elements can contain organic or inorganic developing agents or mixtures thereof. Examples of useful organic developing agents include hydroquinones, catechols, aminophenols, pyrazolidones, phenylenediamines, tetrahydroquinolines, bis(pyridone)amines, cycloalkenones, pyrimidines, reductones, and coumarins. Useful inorganic developing agents include compounds of a metal having at least two distinct valence states which is capable of reducing ionic silver to metallic silver. Such metals include iron, titanium, vanadium and chromium, and the metal compounds employed are typically complexes with organic compounds such as polycarboxylic acids or aminopolycarboxylic acids. Particularly useful developing agents include the iodohydroquinones of Duennebier et al U.S. Pat. No. 3,297,445, the amino hydroxy cycloalkenones of Gabrielsen et al U.S. Pat. No. 3,690,872, the 5-hydroxy and 5-amino pyrimidines of Wyand et al U.S. Pat. No. 3,672,891, the N-acyl derivatives of p-aminophenols of Porter et al British Pat. No. 1,045,303, the 2-acyl and 3-acyl derivatives of 3-pyrazolidones of Stewart et al British Pat. No. 1,023,701, the 2-hydroxyalkyl and 2-aminoalkyl-3-pyrazolidones of DeMarle et al U.S. Pat. No. 3,241,967, the anhydro dihydro reductones of Gabrielsen et al U.S. Pat. No. 3,672,896, and the 6-hydroxy and 6-amino coumarins of Oftedahl U.S. Pat. No. 3,615,521. Advantageous results can be obtained with combinations of organic and inorganic developing agents as described in Vought, *Research Disclosure*, Vol. 150, October 1976, Item 15034, and with combinations of different types of organic developing agents such as the combination of anhydro dihydro amino reductones and aminomethyl hydroquinones of Youngquist U.S. Pat. No. 3,666,457 and the combination of ascorbic acid and 3-pyrazolidone of Sutherns British Pat. No. 1,281,516. Developing agents can be incorporated in the elements in the form of precursors. Examples of such precursors include the halogenated acyl hydroquinones of Porter et al U.S. Pat. No. 3,246,988, the N-acyl derivatives of aminophenols of Porter et al U.S. Pat. No. 3,291,609, the reaction products of a catechol or hydroquinone with a metal described in Barr U.S. Pat. No. 3,295,978, the quinhydrone dyes of Haefner et al U.S. Pat. No. 3,565,627, the cyclohex-2-ene-1,4-diones and cyclohex-2-ene-1-one-4-monoketals of Chapman et al U.S. Pat. No. 3,586,506, and the Schiff bases of p-phenylenediamines of Pupo et al, *Research Disclosure*, Vol. 151, November 1976, Item 15159.

The developing agents can be present in one or more hydrophilic colloid layers of the elements, such as a silver halide emulsion layer or a layer adjacent the emulsion layer. The developing agent can be added to the layer in the form of a dispersion with a film-forming polymer in a water immiscible solvent, as illustrated by Dunn et al U.S. Pat. No. 3,518,088, or as a dispersion with a polymer latex, as illustrated by Chen *Research Disclosure*, Vol. 159, July 1977, Item 15930, and Pupo et al *Research Disclosure*, Vol. 148, August 1976, Item 14850.

The elements and developers can contain development modifiers either to accelerate or restrain development.

Development accelerators of the poly(alkylene oxide) type are disclosed by Blake et al U.S. Pat. Nos. 2,400,532 and 2,423,549, Blake U.S. Pat. No. 2,441,389, Chechak et al U.S. Pat. No. 2,848,330, Howe U.K. Pat. No. 805,827, Piper U.S. Pat. Nos. 2,886,437 and 3,017,271, Carroll et al U.S. Pat. Nos. 2,944,900 and 2,944,902, Dersch et al U.S. Pat. Nos. 3,006,760, 3,084,044 and 3,255,013 and U.K. Pat. No. 1,030,701, Beavers U.S. Pat. No. 3,039,873, Popeck U.S. Pat. No. 3,044,874, Hart et al U.S. Pat. No. 3,150,977, Willems et al U.S. Pat. Nos. 3,158,484, 3,523,796 and 3,523,797, Beavers et al U.S. Pat. Nos. 3,253,919 and 3,426,029, Goffe U.S. Pat. No. 3,294,540, Milton U.S. Pat. No. 3,615,519, Grabhofer et al U.S. Pat. No. 3,385,708, Mackey et al U.S. Pat. Nos. 3,532,501 and 3,597,214, Willems U.S. Pat. No. 3,552,968, Hueckstaedt et al U.S. Pat. No. 3,558,314, Sato et al U.S. Pat. No. 3,663,230, Yoneyama et al U.S. Pat. No. 3,671,247 and Pollet et al U.S. Pat. No. 3,947,273 and U.K. Pat. No. 1,455,413.

Representative development accelerators additionally comprise carboxylic and sulfonic acid compounds and their salts, aliphatic amines, carbamates, adducts of a thioamine with an aldehyde, polyamines, polyamides, polyesters, aminophenols, polyhydroxybenzenes, thioethers and thioamides, poly(vinyl lactams), poly(N-vinyl-2-oxaolidone), protamine sulfate, pyrazolidones, dihydropyridine compounds, hydroxyalkyl ether derivatives of starch, sulfite ester polymers, bis-sulfonyl alkanes, 1,4-thiazines and thiocarbamate, as illustrated by Weyerts U.S. Pat. Nos. 2,367,549 and 2,380,280, Dersch et al U.S. Pat. No. 3,446,618, Mowrey U.S. Pat. No. 3,904,413, Jones et al U.S. Pat. Nos. 3,128,183 and 3,369,905 and U.K. Pat. No. 1,140,741, Arai et al U.S. Pat. Nos. 3,782,946, 3,801,323, 3,804,624 and 3,822,130, Nishio et al U.S. Pat. No. 3,163,536, Beavers et al U.S. Pat. Nos. 3,330,661 and 3,305,363, Willems et al U.S. Pat. No. 3,502,472, Hueckstaedt et al U.S. Pat. No. 3,617,280, Plakunov et al U.S. Pat. No. 3,708,302, Beavers U.S. Pat. No. 3,046,135, Nakajima et al U.S. Pat. No. 3,429,707, Minsk U.S. Pat. Nos. 3,046,132, 3,046,133 and Minsk et al 3,813,247, Rogers et al U.S. Pat. No. 3,192,044, Janssen et al U.S. Pat. No. 3,718,464, Williams et al U.S. Pat. No. 3,021,215, Dann et al U.S. Pat. Nos. 3,038,805 and 3,046,134, Graham et al U.S. Pat. No. 3,046,129, Thompson U.S. Pat. No. 3,419,392, Lovett et al U.S. Pat. Nos. 3,057,724 and 3,165,552, Thompson et al U.S. Pat. No. 3,419,393, Motter U.S. Pat. No. 3,506,443, L Froehloch U.S. Pat. No. 3,574,709, Sato et al U.S. Pat. No. 3,625,697, Timmerman et al U.S. Pat. No. 3,986,877, De Munck et al U.S. Pat. No. 3,615,516, Dersh U.S. Pat. No. 3,006,762, Warren U.S. Pat. No. 2,740,713, Hood et al U.S. Pat. No. 2,751,297, Kennard et al U.S. Pat. Nos. 2,937,090, 3,192,046 and 3,212,899, Munshi et al U.S. Pat. Nos. 3,893,862, Holt U.K. Pat. No. 1,352,196, Chiesa et al U.S. Pat. No. 3,068,102, Stewart et al U.S. Pat. No. 3,625,699, and U.K. Pat. No. 1,019,693.

Representative development accelerators also comprise cationic compounds, disulfides, imidazole derivatives, inorganic salts, surfactants, thiazolidines and triazoles of the type disclosed by Carroll et al U.S. Pat. Nos. 2,271,622, 2,275,727 and 2,288,226, Carroll U.S. Pat. Nos. 2,271,623 and 3,062,645, Allen et al U.S. Pat. No. 2,299,782, Beavers et al U.S. Pat. No. 2,940,851, 2,940,855 and 2,944,898, Burness et al U.S. Pat. No. 3,061,437, Randolph et al U.K. Pat. No. 1,067,958, Grabhoefer et al U.S. Pat. No. 3,129,100, Burness U.S. Pat. No. 3,189,457, Willems et al U.S. Pat. No. 3,532,499, Heuckstaedt et al U.S. Pat. No. 3,471,296, 3,551,158, 3,598,590, 3,615,528, 3,622,329 and 3,640,715. Yoneyama et al U.S. Pat. No. 3,772,021, Nishio et al U.S. Pat. No. 3,615,527, Nakajima et al U.S. Pat. No. 4,001,021, Hara et al U.S. Pat. No. 3,808,003, Sainsbury et al U.S. Pat. No. 2,706,157, Beavers U.S. Pat. No. 3,901,712, Milton U.K. Pat. No. 1,201,054, Snellman et al U.S. Pat. No. 3,502,473, van Stappen U.S. Pat. No. 3,923,515, Popeck et al U.S. Pat. No. 2,915,395 and Ebato et al U.S. Pat. No. 3,901,709.

Representatives of development restrainers are cationic compounds of the type disclosed by Douglas et al U.K. Pat. No. 946,476 and Becker U.S. Pat. No. 3,502,467; esters of the type disclosed by Staud U.S. Pat. No. 2,119,724; lactams of the type disclosed by Munck et al U.K. Pat. No. 1,197,306; mercaptans and thiones, as illustrated by U.K. Pat. No. 854,693, Rogers et al U.S. Pat. No. 3,265,498, Abbott et al U.S. Pat. No. 3,376,310, Greenhalgh et al U.K. Pat. No. 1,157,502, Grasshoff et al U.S. Pat. No. 3,674,478, Salesin U.S. Pat. No. 3,708,303, Luckey U.S. Pat. No. 3,695,881, Stark et al U.K. Pat. No. 1,457,664, Ohyama et al U.S. Pat. No. 3,819,379, Bloom et al U.S. Pat. No. 3,856,520 and Taber et al U.S. Pat. No. 3,647,459; polypeptides, as illustrated by Mueller U.S. Pat. No. 2,699,391; poly-(alkylene oxide) derivatives of the type disclosed by Blake et al U.S. Pat. No. 2,400,532, Sprung U.S. Pat. No. 3,471,297, Whitely U.S. Pat. No.3,516,830 and Milton U.S. Pat. No. 3,567,458; sulfoxides of the type disclosed by Herz, *Research Disclosure,* Vol. 129, January 1975, Item 12927; thiazoles as disclosed by Graham U.S. Pat. No. 3,342,596 and diazoles, triazoles and imidazoles as disclosed by Hammond et al, *Research Disclosure,* Vol. 131, March 1975, Item 13118.

The foregoing discussion is considered sufficiently complete to permit those familiar with the photographic and ultrasonic arts to practice this process. To the extent that specific details and variants of this process and means for its practice are not explicitly discussed they can be appreciated by reference to the photographic and ultrasonographic arts. For example, it is contemplated that the ultrasonic exposure, development and other photographic processing steps of this process can be practiced within the temperature ranges conventionally employed in photography. The elements can be washed to remove solute after ultrasonic exposure and before development, if desired, in the sequential modes of practicing this invention.

The invention is further illustrated by the following examples.

EXAMPLE 1

A converted-halide silver bromochloride emulsion (91 mole percent bromide, 9 mole percent chloride based on total halide), prepared according to Example 1 of Davey et al U.S. Pat. No. 2,592,250, was internally light fogged and coated on a polyester film support to obtain silver coverage of 3.2 g/m$^2$ and gelatin coverage of 3.2 g/m$^2$.

The resulting ultrasonographic element was divided into identical strips for separate exposure in an ultrasonic sensitometer.

The ultrasonic sensitometer was made up of a rectangular plastic vessel open at its top and adapted to form a liquid reservoir. Arranged along the bottom wall of the vessel were seven (7) identical ultrasonic transducers. The ultrasonic transducers each presented a circular emitting surface of 0.785 square centimeters, as viewed from above, and were arranged in a row, adjacent transducers being separated by 2.4 cm. The emitting surfaces of the transducers were in contact with the liquid in the reservoir. The ultrasonic frequency supplied to the transducers was 5 megahertz. Each strip to be tested was immersed in the reservoir just beneath its surface and held spaced from the transducers by about 15.0 cm using a suitable clamp to hold the strip flat and in position.

Six strips of the ultrasonographic element were immersed in the reservoir and soaked for 15 seconds before ultrasonic exposure, exposed imagewise to ultrasonic energy for 10 seconds at 2.5 watts/cm$^2$ and then left immersed for 2 minutes. Kodak Developer D-19 modified to concentrations of potassium iodide of 0, 50, 100, 125, 150 and 175 mg potassium iodide per liter of developer was used in the liquid reservoir. For potassium iodide concentrations of up to 100 mg per liter of developer, the minimum density in background areas remained constant at a value of approximately 0.1 density unit. In image areas a sharp increase in density was observed at potassium iodide concentrations above 50 mg potassium iodide per liter of developer. At a concentration of 100 mg of potassium iodide per liter, the maximum density was approximately 1.4 with a minimum density of approximately 0.1, and at a concentration of 175 mg potassium iodide per liter the density was approximately 3.9 with a minimum density of approximately 1.2.

The procedure above was repeated using two identical strips, but the strips were immersed for 10 seconds prior to ultrasonic exposure, exposed for 10 seconds and left immersed for 2 minutes. The strips were processed in Kodak Developer D-19 modified to contain potassium iodide of 100 and 125 mg potassium iodide per liter of developer, respectively. In FIG. 1, Curve A shows the ultrasonographic characteristic curve obtained with the lower KI concentration and Curve B shows the corresponding curve for the higher KI concentration.

Figure 2:
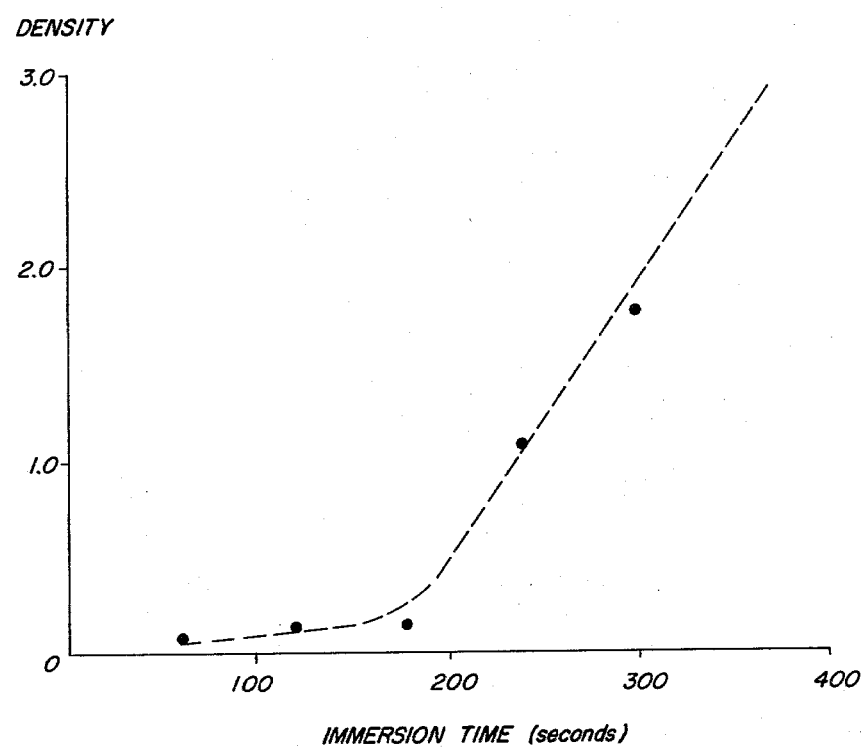

Six identical strips, without prior ultrasonic exposure, were processed in Kodak Developer D-19 modified to contain potassium iodide concentration of 100 mg of potassium iodide per liter of developer, at increasing immersion (soak) times of 1, 2, 3, 4, 5 and 6 minutes, respectively, at 25° C. FIG. 2 shows the curve obtained by plotting density versus immersion time in seconds.

EXAMPLE 2

Two strips of the ultrasonographic element described in Example 1 were exposed in the ultrasonic sensitometer. The liquid reservoir was filled with water. Each strip was immersed in the reservoir and soaked for 10 seconds before ultrasonic exposure. Exposure was to pulsed ultrasonic energy of $10^{-6}$ second pulse density and $10^{-4}$ second intervals between pulses. The first strip was exposed for 10 seconds with a power output of the seven transducers at the film plane of 35, 8.9, 2.2., 0.55, 0.25, 0.08 and 0.031 watts/cm$^2$. The second strip was exposed for 30 seconds at twice the transducer power output used to expose the first strip. Both strips were left immersed for sixty seconds after exposure. Both strips were processed in Kodak Developer D-19 for 3 minutes, fixed, washed and dried. The processed strips were clear and transparent. No images were present.

Figure 3:
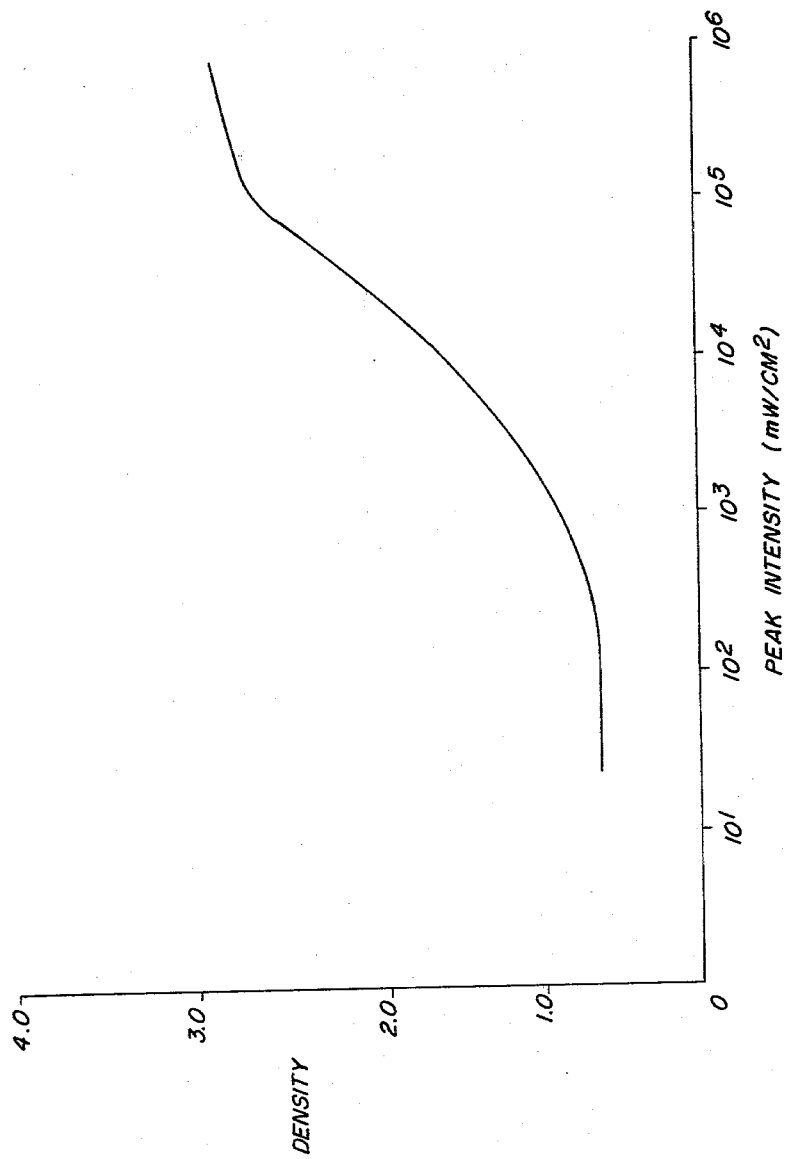

Using two additional strips the above procedure was repeated, except as specifically noted. The water in the reservoir contained 400 mg per liter potassium iodide. The strips were imagewise exposed to ultrasonic energy for 30 seconds and left immersed for 40 seconds. The power output transducers for the third strip was the same as for the first strip. The power output of the transducers for the fourth strip was reduced by half as compared to the exposure of the first strip. Both strips were processed as in Example 2. High density regions corresponding to all seven transducers could be discerned in the third strip. Six regions corresponding to the higher powered transducers could be visually detected on the fourth strip. The size and density of each region on the fourth strip was less than the corresponding one on the third strip. A moderate background density was obtained, which was the same in both strips. FIG. 3 is a plot of density vs. peak ultrasonic intensity (in mw/cm$^2$) for the third and fourth strips.

EXAMPLE 3

Twelve strips of the ultrasonographic element of Example 1 were used in this example. They were exposed as in Example 2 in the reservoir containing water plus potassium iodide at varying concentrations. Total ultrasonic exposure was $10^5$ pulses so that the ultrasonic exposure was the same for all strips. Power output of the transducers was the same as for the first strip of Example 2. Besides the concentration of potassium iodide, only the length of time the strips were left immersed after exposure was varied. Table I below shows the variations in exposure conditions for the strips, numbered 1 to 12. The strips were processed as in Example 2.

Table I

Figure 4:
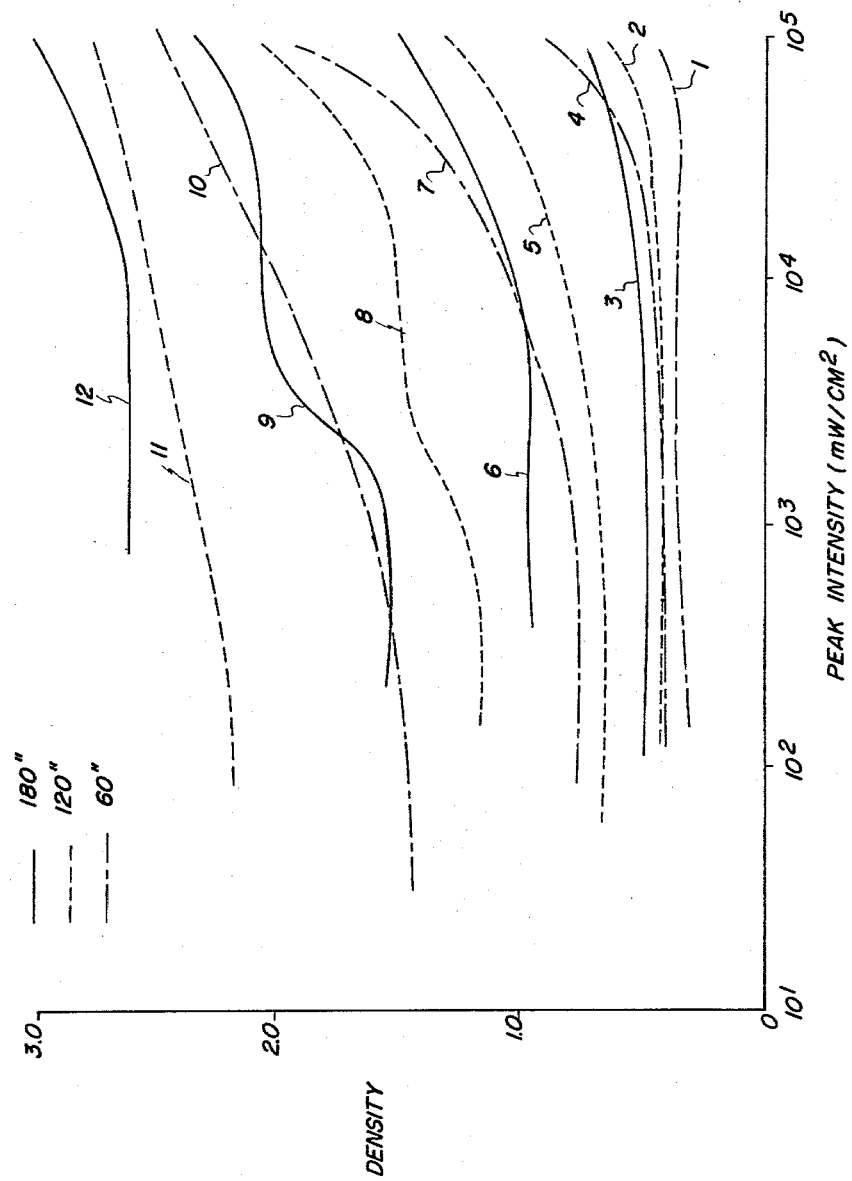

| KI mg/liter | FIG. 4 Characteristic Curve Numbers Immersion Time in Seconds After Exposure | | |
|---|---|---|---|
| | 60″ | 120″ | 180″ |
| 100 | 1 | 2 | 3 |
| 200 | 4 | 5 | 6 |
| 400 | 7 | 8 | 9 |
| 800 | 10 | 11 | 12 |

As shown in FIG. 4, image density increased with increasing iodide ion concentration and to a lesser degree with increasing immersion time after exposure. Background density also increased with increasing iodide ion concentration and with increasing immersion time after exposure. It appeared that the gain in image density generally was less than the gain in background density with increasing immersion time so that in all four concentration series, the best image descrimination was obtained with the shortest immersion time after exposure. In this series, the 400 mg/l KI bath gave the greatest image descrimination.

EXAMPLE 4

Figure 5:
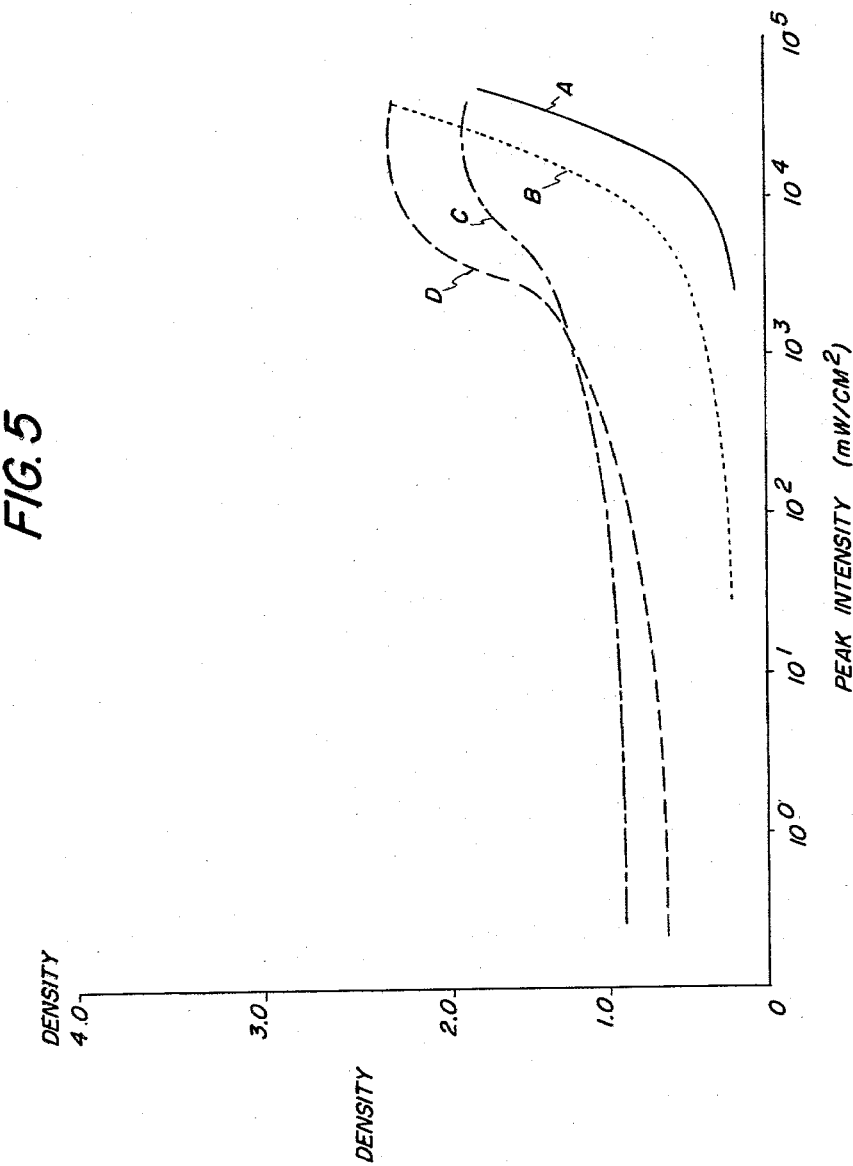

Two strips A and B of the ultrasonographic element of Example 1 were exposed and processed similarly as the third strip in Example 2, except that exposure was carried out in water plus potassium thiocyanate in the reservoir of the ultrasonic sensitometer. The concentration of the thiocyanate was 10 g/l. The strips were exposed to ultrasonic energy and left immersed after exposure for the times shown below in Table II. The characteristic curves are shown in FIG. 5. Good ultrasonic images were produced.

Two strips C and D were exposed as above in the reservoir containing dissolved potassium thiocyanate (20 g/l) and were processed in Kodak Developer D-19. One strip was removed immediately after exposure and the other was left immersed for 30 seconds following ultrasonic exposure, as shown below in Table II. The characteristic curves are shown in FIG. 5.

Table II

| Strip | Potassium thiocyanate conc. (g/l) | Ultrasonic Exposure Time (sec.) | Immersion After Exposure (sec.) |
|---|---|---|---|
| A | 10 | 30 | 0 |
| B | 10 | 30 | 30 |
| C | 20 | 30 | 0 |
| D | 20 | 10 | 30 |

EXAMPLE 5

Experiments similar to those of Example 4 were conducted to illustrate regions with ultrasonic exposure using an aqueous potassium thiosulfate solution in the reservoir. At concentrations of 1.25 to 2.50 g/l of thiosulfate, ultrasonic exposures were made using the same transducer power levels as for the third strip of Example 2 with ultrasonic exposure for 30 seconds. The strips were processed in Kodak Developer D-19 for three minutes, fixed, washed and dried. An ultrasonic characteristic curve was obtained exhibiting acceptable maximum densities and low minimum densities.

EXAMPLE 6

Figure 6:
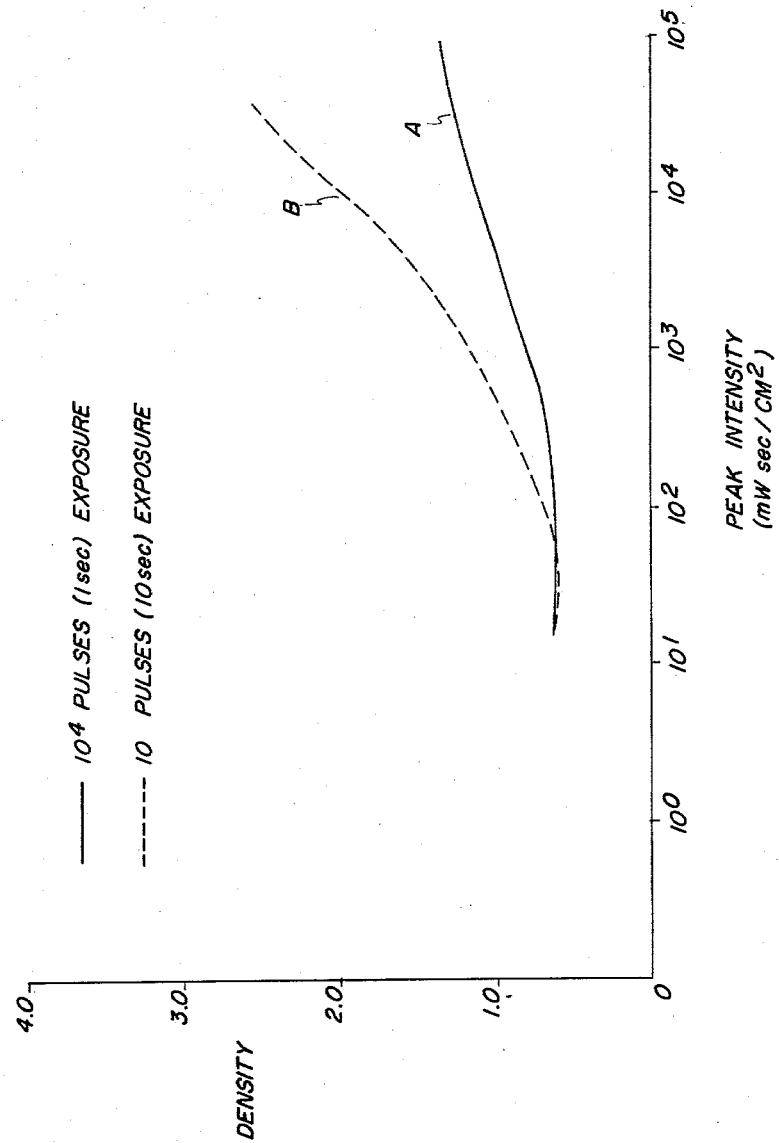

FIG. 6 shows ultrasonic characteristic curves for two strips of the ultrasonographic element of Example 1 exposed similarly as the third strip in Example 2, except that the strips were exposed in an aqueous potassium iodide solution (400 mg/l) and processed in Kodak Developer D-19 for three minutes. Both strips were immersed for 10 seconds before exposure, exposed to pulsed ultrasonic energy of $10^{-6}$ second pulse duration, $10^{-5}$ second intervals between pulses and were left immersed for 60 seconds after exposure. The first strip (A) was given $10^4$ pulses (1 second total exposure) and the second strip (B) was given $10^5$ pulses (10 seconds total ultrasonic exposure). The greater maximum density was obtained on the second strip.

EXAMPLE 7

A 0.68 micron silver chloride core-shell emulsion was coated on a polymeric film support to achieve silver coverage of 2.15 g/m$^2$ and gelatin coverage of 4.3 g/m$^2$. Strips of the coating were ultrasonically exposed and developed under varying conditions. Exposure was carried out in the ultrasonic sensitometer of Example 1. Actual exposures in this example were to higher power outputs at 400, 200, 110, 40, 25, 8 and 2.7 watts/cm$^2$ or lower power outputs at 80, 25, 10, 4, 2.2, 0.75 and 0.27 watts/cm$^2$.

Eight strips of the ultrasonographic element were exposed to pulsed ultrasonic energy ($10^{-6}$ pulse width, $10^{-4}$ pulse period and $10^5$ pulses) in a solution of potassium sulfite (K$_2$SO$_3$) in water and developed as shown below in Table III. Development time was six minutes at 20° C. The coatings were then fixed, washed and dried.

Table III

| Strip | Sulfite Conc. (g/l) | Ultrasonic Power | Developer |
|---|---|---|---|
| 1 | 10 | higher | Ref. Surface Developer B |
| 2 | 10 | lower | Ref. Surface Developer B |
| 3 | 10 | higher | Ref. Internal Developer A |
| 4 | 10 | lower | Ref. Internal Developer A |
| 5 | 100 | higher | Ref. Surface Developer B |
| 6 | 100 | lower | Ref. Surface Developer B |
| 7 | 100 | higher | Ref. Internal Developer A |
| 8 | 100 | lower | Ref. Internal Developer A |

Strips 1 and 2 showed slight negative images corresponding to the most powerful transducers. Background density was light gray. Strips 3 and 4 showed no images. They were uniformly dark. Strips 5 and 6 showed faint reversal images corresponding to the the most powerful transducers. Strips 7 and 8 showed strong reversal images varying in size in proportion to the power range of the corresponding transducers.

The invention has been described with particular reference to preferred embodiments therein but it will be understood that variations and modifications can be effected within the spirit and scope of the invention.

What is claimed is:

1. A process of producing an ultrasonographic image in an element comprised of a support and, coated thereon, a silver halide emulsion layer containing internally fogged silver halide grains, comprising
   contacting the element with a transport liquid in the presence of a diffusible solute capable of rendering the internally fogged silver halide grains, after contact with the solute, developable in a surface developer,
   exposing the element to ultrasound in an image pattern to accelerate imagewise diffusion of the solute into contact with the internally fogged silver halide grains and
   developing the internally fogged silver halide grains contacted with the solute in response to ultrasound exposure to produce a visible image defined by the imagewise pattern of ultrasonic exposure.

2. A process of producing an ultrasonographic image in an element comprised of a support and, coated thereon, a silver halide emulsion layer containing internally fogged silver halide grains, comprising
   contacting the element with a transport liquid in the presence of a diffusible solute capable of rendering the internally fogged silver halide grains, after contact with the solute, developable in a surface developer,
   exposing the element to ultrasound in an image pattern to accelerate imagewise diffusion of the solute into contact with the internally fogged silver halide grains, and
   thereafter developing the internally fogged silver halide grains contacted with the solute in response to ultrasound exposure with a surface developer to produce a visible image defined by the imagewise pattern of ultrasonic exposure.

3. A process according to claim 1 in which the transport liquid is a silver halide developer, so that upon imagewise ultrasonically exposing the element imagewise development of the element commences.

4. A process according to claim 1 or 2 in which the transport liquid contains iodide ions.

5. A process according to claim 1 or 2 in which the transport liquid contains a silver halide solvent.

6. A process according to claim 5 in which the silver halide solvent is a thiocyanate, thioether, thiosulfate or sulfite compound.

7. A process according to claim 1 or 2 in which the element is exposed to pulsed ultrasonic radiation.

8. A process according to claim 1 or 2 in which the element is imagewise exposed to less than 100 watt-sec/cm$^2$ of ultrasonic radiation.

9. A process according to claim 1 or 2 in which the silver halide emulsion layer contains internally fogged converted-halide silver halide grains which are at least 50 mole percent bromide and less than 10 mole percent iodide, based on total halide.

10. A process according to claim 2 in which the step of developing the element is delayed, following imagewise ultrasonic exposure, for a period sufficient to enhance further the development response of the element.

11. A process of producing an ultrasonographic image in an element comprised of a support and at least one silver halide emulsion layer containing a vehicle and internally fogged converted-halide silver halide grains which are at least 50 mole percent bromide and up to 10 mole percent iodide, based on total halide, any remaining halide being chloride, comprising contacting the emulsion layer with a transport liquid containing iodide ions in a concentration of from 100 to 1000 mg per liter of transport liquid, exposing the element to ultrasound in an image pattern to accelerate imagewise diffusion of the iodide ions into contact with the internally fogged silver halide grains, ultrasound exposure being at an intensity and for a duration which, in the presence of the iodide ions, is sufficient to increase the development response of the emulsion layer, but which, in the absence of the iodide ions, is insufficient to increase the development response of the emulsion layer, and developing the internally fogged converted-halide silver halide grains contacted with the iodide ions in response to ultrasound exposure to produce a visible image defined by the imagewise pattern of ultrasonic exposure.

12. A process according to claim 11 in which the transport liquid and iodide ions form an aqueous solution in which the iodide ions are present in a concentration of from 200 to 800 mg per liter of transport liquid.

13. A process of producing an ultrasonographic image in an element comprised of a support and at least one silver halide emulsion layer containing a vehicle and internally fogged silver halide grains, comprising contacting the emulsion layer with a transport liquid in the presence of from 0.1 to 30 grams per liter of thiocyanate or thiosulfate ions, exposing the element to ultrasound in an image pattern to accelerate imagewise diffusion of the iodide ions into contact with the internally fogged silver halide grains, ultrasound exposure being at an intensity and for a duration which, in the presence of the thiocyanate or thiosulfate ions, is sufficient to increase the development response of the emulsion layer, but which, in the absence of the thiocyanate or thiosulfate ions, is insufficient to increase the development response of the emulsion layer, and developing the internally fogged silver halide grains contacted with the thiocyanate or thiosulfate ions in response to ultrasound exposure to produce a visible image defined by the imagewise pattern of ultrasonic exposure.

14. A process according to claim 13 in which the transport liquid and the thiocyanate ions form an aqueous solution in which the thiocycnate ions are present in a concentration of from 5 to 15 grams per liter.

15. A process according to claim 13 in which the transport liquid and thiosulfate ions form an aqueous solution in which the thiosulfate ions are present in a concentration of from 0.5 to 5 grams per liter.

16. A process of producing an ultrasonographic image in an element comprised of a support and at least one silver halide emulsion layer containing a vehicle and internally fogged silver halide grains which are at least 50 mole percent silver chloride, based on total silver halide, comprising contacting the emulsion layer with a transport liquid in the presence of from 10 to 50 grams per liter of sulfite ions, exposing the element to ultrasound in an image pattern to accelerate imagewise diffusion of sulfite ions into contact with the internally fogged silver halide grains, ultrasound exposure being at an intensity and for a duration which, in the presence of sulfite ions, is sufficient to increase the development response of the emulsion layer, but which, in the absence of the sulfite ions, is insufficient to increase the development response of the emulsion layer, and developing the internally fogged silver halide grains contacted with the sulfite ions in response to ultrasound exposure to produce a visible image defined by the imagewise pattern of ultrasonic exposure.

17. A process according to claim 11, 13 or 16 in which the step of contacting the element with the transport liquid and the step of developing the element are sequentially performed by bringing the element into contact with the developer following imagewise ultrasonically exposing.

18. A process according to claim 11, 13 or 16 in which the element is imagewise exposed to less than 100 watt-sec/cm$^2$ of ultrasonic radiation.

* * * * *